United States Patent
Zhang et al.

(10) Patent No.: US 7,403,640 B2
(45) Date of Patent: Jul. 22, 2008

(54) SYSTEM AND METHOD FOR EMPLOYING AN OBJECT-ORIENTED MOTION DETECTOR TO CAPTURE IMAGES

(75) Inventors: Bin Zhang, Fremont, CA (US); Fereydoon Safai, Los Alto Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 665 days.

(21) Appl. No.: 10/834,589

(22) Filed: Apr. 29, 2004

(65) Prior Publication Data

US 2005/0091267 A1 Apr. 28, 2005

Related U.S. Application Data

(63) Continuation-in-part of application No. 10/694,367, filed on Oct. 27, 2003.

(51) Int. Cl.
G06K 9/00 (2006.01)
G06K 9/46 (2006.01)
G06F 15/00 (2006.01)
G06F 17/00 (2006.01)

(52) U.S. Cl. .................. 382/107; 382/240; 702/189; 706/50

(58) Field of Classification Search .......... 382/107, 382/103; 348/207.1, 208.99, 120; 707/101
See application file for complete search history.

(56) References Cited

U.S. PATENT DOCUMENTS

| | | | |
|---|---|---|---|
| 5,761,229 A | 6/1998 | Baldwin et al. | |
| 5,771,254 A | 6/1998 | Baldwin et al. | |
| 5,809,050 A | 9/1998 | Baldwin et al. | |
| 5,815,432 A | 9/1998 | Naffziger et al. | |
| 5,835,003 A | 11/1998 | Nickel et al. | |
| 5,835,514 A | 11/1998 | Yuen et al. | |
| 5,903,682 A * | 5/1999 | Chun | 382/276 |
| 5,949,256 A | 9/1999 | Zhang et al. | |
| 5,959,241 A | 9/1999 | Sriram et al. | |
| 5,986,923 A | 11/1999 | Zhang et al. | |
| 6,006,285 A | 12/1999 | Jacobs et al. | |
| 6,035,055 A | 3/2000 | Wang et al. | |
| 6,069,918 A * | 5/2000 | Meyer et al. | 375/240.17 |
| 6,075,696 A | 6/2000 | Progl et al. | |
| 6,088,428 A | 7/2000 | Trandal et al. | |
| 6,116,767 A | 9/2000 | Chaiken et al. | |
| 6,151,008 A | 11/2000 | Zhang | |
| 6,157,266 A | 12/2000 | Tsai et al. | |
| 6,163,867 A | 12/2000 | Miller et al. | |
| 6,179,432 B1 | 1/2001 | Zhang et al. | |
| 6,185,329 B1 | 2/2001 | Zhang et al. | |
| 6,195,713 B1 | 2/2001 | Chaiken et al. | |

(Continued)

OTHER PUBLICATIONS

Lin et al, A Principal Component Clustering Approach to Object-Oriented Motion Segmentation and Estimation, Journal of VLSI Signal Processing 17, 163-187 (1997).*

(Continued)

*Primary Examiner*—Andrew W. Johns
*Assistant Examiner*—Andrae S Allison

(57) ABSTRACT

The disclosure relates to a system having an image capturing device and an object-oriented motion detector with a motion analysis algorithm that detects motion of a subject and signals the image capturing device responsive to the motion of the subject.

16 Claims, 3 Drawing Sheets

U.S. PATENT DOCUMENTS

| | | | |
|---|---|---|---|
| 6,209,023 | B1 | 3/2001 | Dimitroff et al. |
| 6,230,282 | B1 | 5/2001 | Zhang |
| 6,246,721 | B1 | 6/2001 | Zhang et al. |
| 6,266,714 | B1 | 7/2001 | Jacobs et al. |
| 6,269,376 | B1 | 7/2001 | Dhillon et al. |
| 6,278,491 | B1 | 8/2001 | Wang et al. |
| 6,279,056 | B1 | 8/2001 | Jacobs et al. |
| 6,282,143 | B1 | 8/2001 | Zhang et al. |
| 6,295,115 | B1 | 9/2001 | Zhang et al. |
| 6,298,145 | B1 | 10/2001 | Zhang et al. |
| 6,310,495 | B1 | 10/2001 | Zhang |
| 6,313,696 | B1 | 11/2001 | Zhang |
| 6,337,917 | B1 * | 1/2002 | Onural et al. ............... 382/107 |
| 6,341,246 | B1 * | 1/2002 | Gerstenberger et al. ..... 700/245 |
| 6,347,313 | B1 | 2/2002 | Ma et al. |
| 6,366,701 | B1 * | 4/2002 | Chalom et al. .............. 382/236 |
| 6,374,251 | B1 * | 4/2002 | Fayyad et al. ............... 707/101 |
| 6,389,168 | B2 | 5/2002 | Altunbasak et al. |
| 6,393,054 | B1 | 5/2002 | Altunbasak et al. |
| 6,393,499 | B1 | 5/2002 | Chaiken et al. |
| 6,433,605 | B1 | 8/2002 | Zhang |
| 6,447,935 | B1 | 9/2002 | Zhang et al. |
| 6,457,082 | B1 | 9/2002 | Zhang et al. |
| 6,476,308 | B1 | 11/2002 | Zhang |
| 6,507,843 | B1 | 1/2003 | Dong et al. |
| 6,512,119 | B2 | 1/2003 | Bratkovski et al. |
| 6,538,488 | B2 | 3/2003 | Zhang et al. |
| 6,556,470 | B1 | 4/2003 | Vincent et al. |
| 6,584,433 | B1 * | 6/2003 | Zhang et al. ................. 702/189 |
| 6,594,772 | B1 | 7/2003 | Tsai et al. |
| 6,601,070 | B2 | 7/2003 | Zhang et al. |
| 6,619,787 | B2 | 9/2003 | Zhang et al. |
| 6,624,002 | B2 | 9/2003 | Bratkovski et al. |
| 6,625,604 | B2 | 9/2003 | Muntz et al. |
| 6,633,772 | B2 | 10/2003 | Ford et al. |
| 6,634,732 | B2 | 10/2003 | Farr et al. |
| 6,651,088 | B1 | 11/2003 | Zhang et al. |
| 6,654,827 | B2 | 11/2003 | Zhang et al. |
| 6,662,333 | B1 | 12/2003 | Zhang et al. |
| 6,663,797 | B2 | 12/2003 | Bratovski et al. |
| 6,665,423 | B1 * | 12/2003 | Mehrotra et al. ............ 382/107 |
| 6,670,981 | B1 | 12/2003 | Vincent et al. |
| 6,674,932 | B1 | 1/2004 | Zhang et al. |
| 6,686,951 | B1 * | 2/2004 | Dickson et al. ............. 348/120 |
| 6,687,701 | B2 | 2/2004 | Karamanolis et al. |
| 6,688,717 | B2 | 2/2004 | Chang et al. |
| 6,701,035 | B2 | 3/2004 | Zhang et al. |
| 6,704,811 | B2 | 3/2004 | Jacobs et al. |
| 6,931,350 | B2 * | 8/2005 | Zhang ........................ 702/179 |
| 7,039,638 | B2 * | 5/2006 | Zhang et al. .................... 707/7 |
| 7,099,880 | B2 | 8/2006 | Arning et al. |
| 7,139,695 | B2 | 11/2006 | Castellanos |
| 2002/0129038 | A1 | 9/2002 | Cunningham |
| 2003/0115192 | A1 | 6/2003 | Kil et al. |
| 2003/0115434 | A1 | 6/2003 | Mahalingam et al. |
| 2003/0115439 | A1 | 6/2003 | Mahalingam et al. |
| 2004/0001509 | A1 | 1/2004 | Zhang et al. |
| 2004/0019466 | A1 | 1/2004 | Minor et al. |
| 2004/0080618 | A1 * | 4/2004 | Norris et al. ............. 348/207.1 |
| 2005/0195278 | A1 * | 9/2005 | Nair ........................... 348/143 |

OTHER PUBLICATIONS

Gaffney et al, "Trajectory clustering with mixtures of regression models", In Surajit Chaudhuri and David Madigan, editors, Proc. Fifth ACM SIGKDD Inter. Conf. on Knowledge Discovery and Data Mining, Aug. 15-18, pp. 63-72, N.Y., 1999. ACM Press.*

Zhang et al,"K-Harmonic Means—A Data Clustering Algorithn" Software Technology Laboratory, Hp Laboratories Palo Alto, HPL-1999-124, Oct. 1999.*

Rehrmann, "Object-Oriented Motion Estimation in Color Image Sequences", ECCV '98: Proceedings of the 5th European Conference on Computer Vision-Volume I, 1998, pp. 704-719.*

Kottke et al, "Motion Estimation Via Cluster Matching", IEEE Transactions on Pattern Analysis and Machine Intelligence, vol. 16, No. 11, Nov. 1994.*

Kim et al, "Motion Estimation Method Using Multiple Linear Regression Model", Visual Communications and Image Processing '97, Jan Biemond, Edward J. Delp III, Editors, Jan. 1997, pp. 600-607.*

Hamerly et al, "Alternatives to the k-means algorithm that find better clusterings", CIKM '02, Nov. 4-9, 2002.*

De Sarbo, W. S., et al., A Maximum Likelihood Methodology for Clusterwise Linear Regression, Journal of Classification, vol. 5, 1998, pp. 249-282.

Henning, C., Models and Methods for Clusterwise Linear Regression, undated, pp. 1-9.

Henning, C., Regression Fixed Point Clusters: Motivation, Consistency and Simulations, Feb. 20, 2000, pp. 1-49.

Lin, Tun-Ting, et al., A Principal Component Clustering Approach to Object-Oriented Motion Segmentation and Estimation, Journal of VLSI Signal Processing, vol. 17, pp. 163-187 (1997) The Netherlands.

* cited by examiner

SYSTEM AND METHOD FOR EMPLOYING AN OBJECT-ORIENTED MOTION DETECTOR TO CAPTURE IMAGES

CROSS-REFERENCE TO RELATED APPLICATION

This application is a continuation-in-part of U.S. patent application Ser. No. 10/694,367, filed Oct. 27, 2003 entitled "Data Mining Method And System Using Regression Clustering by Bin Zhang."

BACKGROUND

Cameras and/or other image capturing devices may require a user to perform certain procedures to take a photograph. However, some portions of the picture taking process may be automated in certain image capturing systems. For example, some cameras may have auto-focus and auto-exposure-adjustment.

Cameras may be used to capture images of objects in motion. For example, a user may wish to capture an image of a baseball at the moment that a bat strikes it. Accordingly, the user may employ a camera to photograph such an image by activating the camera at the appropriate moment. This approach is risky, however, because the user may not adequately estimate the appropriate moment. Unless the user activates the camera at exactly the correct moment, the image captured may not be the desired moment of impact.

Alternatively, the user may improve the chances of capturing the desired moment by taking a series of pictures. For example, a user may employ a video camera to capture a series of images before and after the bat contacts the baseball. The images thus captured may then be analyzed to determine at what moment the ball changed direction. Accordingly, the appropriate image may be selected. However, while this approach improves the likelihood that the correct image will be captured, it requires time for analysis, more storage space (e.g. film or electronic storage), and additional energy consumption. In addition, a video sequence may not contain the best moment because the shutter of a video camera is released at equal time intervals and has no correlation with the state of the moving object being captured.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
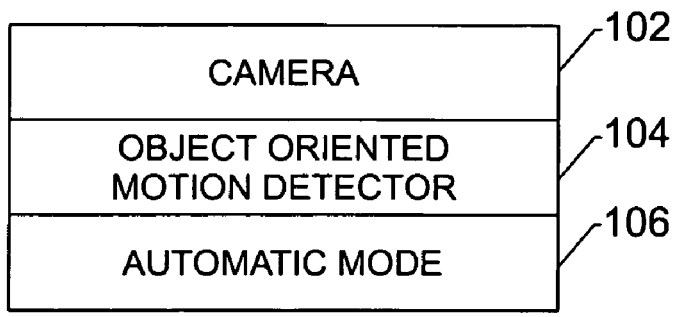
FIG. 1 is a block diagram of a camera system in accordance with embodiments of the present invention.

One or more specific embodiments of the present technique will be described below. In an effort to provide a concise description of these embodiments, not all features of an actual implementation are described in the specification. It should be appreciated that in the development of any such actual implementation, as in any engineering or design project, numerous implementation specific goals, such as compliance with system-related and business-related constraints, which may vary from one implementation to another. Moreover, it should be appreciated that such a development effort might be complex and time consuming, but would nevertheless be a routine understanding of design, fabrication, and manufacture for those of ordinary skill having the benefit of this disclosure.

Image capturing devices such as cameras may use light to create captured images, such as projections, photographs and videos. For example, digital and conventional cameras may capture images using a series of camera lenses to focus light onto film or a semiconductor device. Further, some cameras may record such captured images on film or in electronic form.

Once the light is electronically recorded, a computer may then break this electronic information down into digital data. Accordingly, a series of such data taken from a sequence of images may be observed or recorded. This data may then be analyzed using any number of data analysis algorithms including algorithms for object-oriented motion detection. The term "object oriented" may generally be used to describe a system that deals with different types of objects, and where actions taken may depend on what type of object is being manipulated. One algorithm that may be used for object-oriented motion detection and analyzing data is regression clustering (RC). An exemplary regression clustering technique is discussed in Bin Zhang, *Regression Clustering*, The Proceedings of the Third IEEE International Conference on Data Mining, 451-458, Nov. 19-22, 2003 (Melbourne, Fla.), which is hereby incorporated by reference.

Accordingly, a camera or other image capturing device may recognize multiple moving subjects and may be automated to capture images based on object-oriented motion detection. For example, a camera may be used to photograph a human runner. The camera, using an algorithm for object-oriented motion detection, may recognize the arms and legs of the runner as separate moving subjects. Further, the camera may automatically photograph the runner when the camera recognizes that any of the separate subjects are demonstrating a certain motion.

A camera that is automated using an object-oriented motion detector may have several advantages. First, the motion detection may be substantially in real time. Real time motion detection may save user time in situations where it would be necessary for the user to analyze a series of captured images to determine a desired moment. Similarly, a camera having an automated motion detector may save costly material such as the film required for such user analysis. Further, an automated motion detection camera may save storage and energy by reducing required operating time and the amount of necessary data storage. This is especially beneficial for mobile applications that rely on batteries and limited storage space. Also, the automation may cut down on user error, which may inevitably save time and materials.

FIG. 1 is a block diagram of a camera system 100 in accordance with embodiments of the present invention. The camera system 100 may comprise a camera 102 having an object-oriented motion detector 104 and an automatic mode 106 in accordance with embodiments of the present invention. In one embodiment, the camera 102 may comprise a digital camera having a special automatic shutter release mode 106. This mode of operation 106 may allow a user to capture special moments by simply pointing the camera where a certain motion is expected or by simply following a moving subject with the camera 102. In one embodiment, the object-oriented motion detector 104 may use regression clustering to detect a motion extreme of the moving subject. When a motion extreme of the moving subject is detected, the shutter of the camera may be automatically released and an image of the moving subject at the motion extreme may thus be captured.

Figure 2:
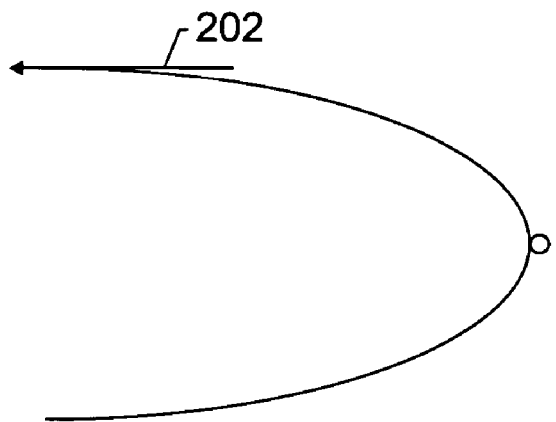
FIG. 2 is a diagrammatical view illustrating a motion extreme in accordance with embodiments of the present invention.
Figure 2:

FIG. 2 is a diagrammatical view illustrating a motion extreme in accordance with embodiments of the present invention. The diagram is generally referred to by the reference numeral 200. A motion extreme may be defined in a given direction as the moment in time and the position in space where the speed projected to the given direction becomes zero and is turning back. Using a multiple motion path estimator such as regression clustering, a motion estimation can be obtained from a sequence of images and can be used to automate image capturing.

Object-oriented motion detection, which may be referred to herein as motion detection, may comprise two parts. One part of motion detection may include the motion detection of the fastest moving object. A second part of motion detection may include background detection. The background may be moving because of the movement of the camera. Accordingly, the motion-extreme may be calculated based on the difference between the motion of the fast moving object and the background. Also, motion estimation can be done at different resolutions for a speed and performance tradeoff.

One example of motion extreme detection is based on a motion curve estimated by a regression clustering algorithm in which a speed vector 202 is calculated at a moment in time. Further, the speed vector's projection may be calculated and used for motion extreme detection. While various regression clustering techniques may be used, in one embodiment, the regression clustering algorithm comprises a K-Harmonic Means regression algorithm and a K-Harmonic Means performance function. In summary, the K-Harmonic Means regression algorithm may comprise the acts of choosing a parameter K for the K functions, initializing the K functions, calculating data point distances, calculating membership probability and weighting factors, recalculating the K functions using regression, and stopping or continuing the iteration depending on whether a threshold has been reached.

Figure 3:
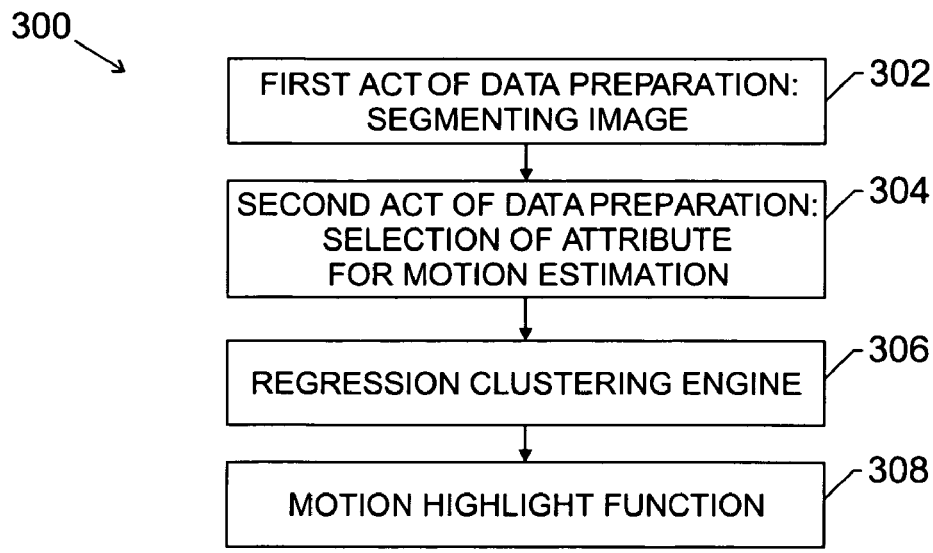
FIG. 3 is a block diagram illustrating a method of motion estimation in accordance with embodiments of the present invention.

FIG. 3 is a block diagram illustrating a method of motion estimation in accordance with embodiments of the present invention. In one embodiment, this method of motion estimation facilitates automatic detection of one or more moving objects and detection of one or more motion extremes. Specifically, FIG. 3 illustrates a method of multiple path motion estimation 300 comprising a first act of data preparation (block 302), a second act of data preparation (block 304), utilization of a regression clustering engine (block 306), and a motion highlight function (block 308).

Block 304 represents the first act of data preparation, which may comprise essentially breaking a frame or image into individual moving parts. A static image can be treated as a mapping from a 2D space to a 3D RGB color-space, image: $[a,b] \times [c,d] \rightarrow [0,225] \times [0,225] \times [0,225]$. Similarly, a video image can be treated as a mapping from a 3D space to another 3D space, video: $[a,b] \times [c,d] \times T \rightarrow [0,225] \times [0,225] \times [0,225]$. Static or video images contain regions of continuous changes and boundaries of sudden changes in color. Regression clustering may be used to automatically identify the motion of the regions of continuous change. The regions may then be automatically assigned a regression function, which interpolates the motion of that part of the image. Accordingly, the first act of data preparation (block 304) may comprise user selection or automatic segmenting of a frame or image into regions by color. In other embodiments, the frame or image may be segmented based on criteria other than color, such as curve detection and consistent motion based on data from multiple frames or images.

Block 306 represents the second act of data preparation. This act (block 306) may comprise the selection of a color or any other attribute for motion estimation. In one embodiment, this act comprises extracting pixels from an image sequence based on whether the pixel color substantially matches a previously selected color. For example, pixel coordinates may be extracted using a three-coordinate system including: a time coordinate, an X-axis coordinate, and a Y-axis coordinate (time, x_coord, y_coord). This data may then be provided to the regressive clustering algorithm (block 306) as a "flat" table dataset. Alternatively, if multiple colors are selected, a four-coordinate system may be utilized comprising: a time coordinate, an X-axis coordinate, a Y-axis coordinate, and a color coordinate (time, x_coord, y_coord, color). As in the three-coordinate example, this data may be provided to the regressive clustering algorithm (block 306) as a "flat" table dataset. Also, it should be noted that the time variable in both coordinate systems may represent real time or a simple index based on frame or image order.

Block 306 represents the regression clustering engine. In one embodiment, the regression clustering engine (block 306) is essentially a data analysis tool that breaks data into associated groups and establishes correlative functions. The regression clustering engine (block 306) may be thought of as comprising two functions, clustering and regression.

Regression is a robust system that is widely used for data analysis. However, regression is generally applicable only to data that is internally consistent. In other words, attributes should be linked by only one function. Otherwise, some data elements must be removed in order to deliver satisfactory results.

Clustering, on the other hand, is an algorithmic tool for analyzing real-world data by grouping or clustering data into subsets. Clustering may reflect the concept that a mixture of simpler distributions may model complex distributions of real-world data. Thus, clustering may be used to reveal structure in these complex distributions of real world data.

In regression clustering, multiple regression functions are applied to data simultaneously. These functions guide the clustering of data into K subsets, each with a simpler distribution matching its guiding function. One example of a regression clustering algorithm is the Regression-K-Harmonic Means clustering algorithm. In accordance with embodiments of the present invention, the Regression-K-Harmonic Means clustering algorithm may be used as a regression clustering engine (block 306) for multiple path motion estimation in an image capturing device, such as a camera 102. The Regression-K-Harmonic Means clustering algorithm will be discussed in further detail below along with further discussion of the regression clustering engine (block 306).

Block 308 represents the motion and highlight function. In one embodiment, block 308 comprises the use of each the following K functions: $(x,y)=(f_{k,x}(t), f_{k,y}(t))$, $k=1,\ldots, K$ and $(x,y,color)=(f_{k,x}(t), f_{k,y}(t))$, $k=1,\ldots, K$. Each of these K functions may represent a particular motion path in a video sequence. Additionally, if more than one color is used in the data, color attributes may be part of the function values. Accordingly, these functions may guide a rendering of an image sequence with highlights to show motion paths on a display, such as a computer screen.

Figure 4:
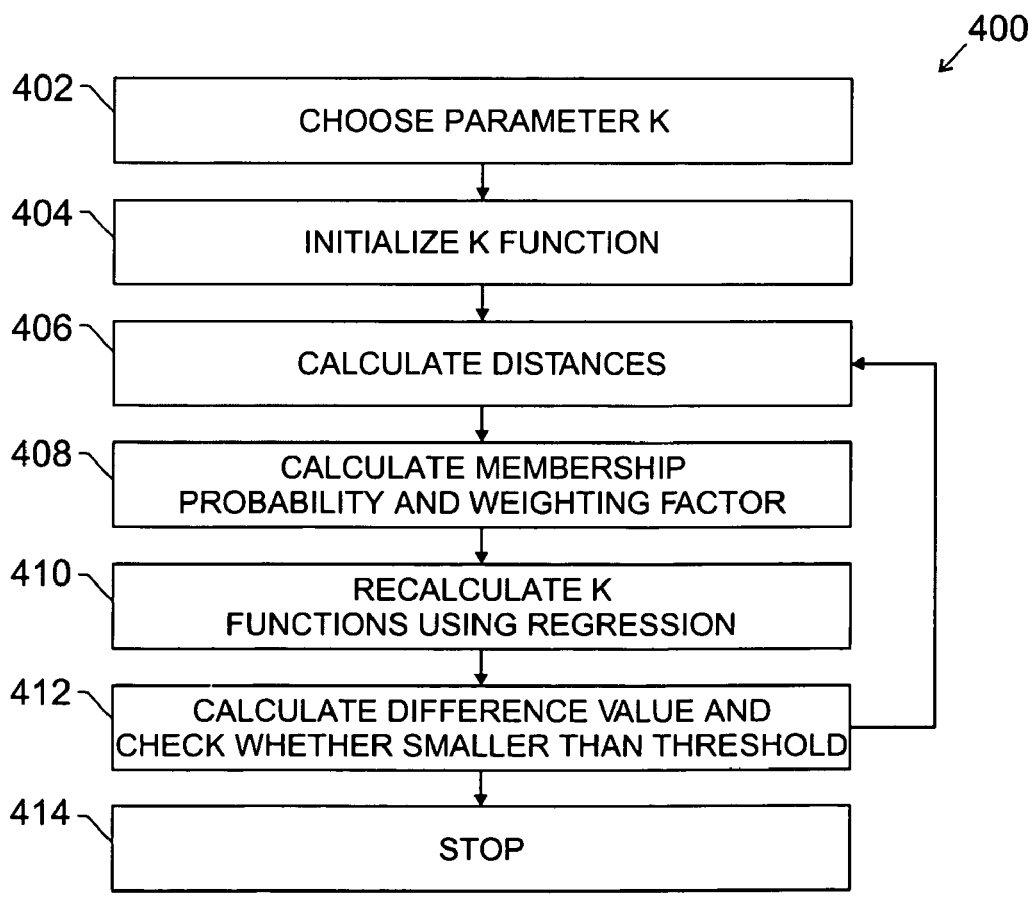
FIG. 4 is a block diagram illustrating an exemplary method for performing regression clustering in accordance with embodiments of the present invention.

FIG. 4 is a block diagram illustrating an exemplary method for performing regression clustering in accordance with embodiments of the present invention. Specifically, FIG. 4 illustrates an iterative regression clustering method using a K-Harmonic Means objective function 400 comprising the acts of choosing a parameter K for the K functions (block 402), initializing the K functions (block 404), calculating data point distances (block 406), calculating membership probability and weighting factors (408), recalculating the K functions using regression (block 410), and stopping or continuing the iteration depending on whether a threshold has been reached (block 412). Further, this iterative regression clustering method 400 illustrates one embodiment of the regression clustering engine (block 306) illustrated in FIG. 3.

Block 402 represents choosing the parameter K for the K functions discussed above. K is a number of functions correlating to the number of regression clusters in the particular problem to be solved. For example, if five moving objects are present, the best value for K may be five. In one embodiment, a user selects the value of K based on the user's domain knowledge. In another embodiment, K is automatically chosen based on image characteristics. In still another embodiment, K may be given an automatic start value at a reasonable number that will converge to the appropriate K value. For example, if a series of images has four moving objects and K is given the initial value of five, two K functions will converge to the same set of data. These converging functions will be combined and thus K reaches the appropriate value for the example given, four.

Block 404 represents initializing the K functions. In one embodiment, the initialization is done randomly or based on an established default. However, in other embodiments the initialization may be based on any number of heuristics that may facilitate convergence.

Block 406 represents calculating the distances from each data point to each of the functions. Additionally, harmonic averages of the distances may be calculated. These distances may be used to associate data points with functions having the smallest distance from the respective data points. In other words, based on the distance established in block 406, data points may be partitioned into K subsets, wherein each subset is associated with one moving object. Accordingly, block 408 represents calculating a membership probability and a weighting factor based on the distances calculated in block 406. This may be referred to as the clustering phase, which will be discussed in further detail below.

Block 410 represents recalculation of the K functions based on the membership functions and the weighting factors using regression. Block 412 represents calculating and checking a difference value. The value may be a result of comparing changes in the membership probabilities, the K functions, and/or the harmonic averages. If the difference value is smaller than a chosen threshold, the iteration stops. However, if the difference value is above the threshold, the iteration continues at block 406.

Figure 5:
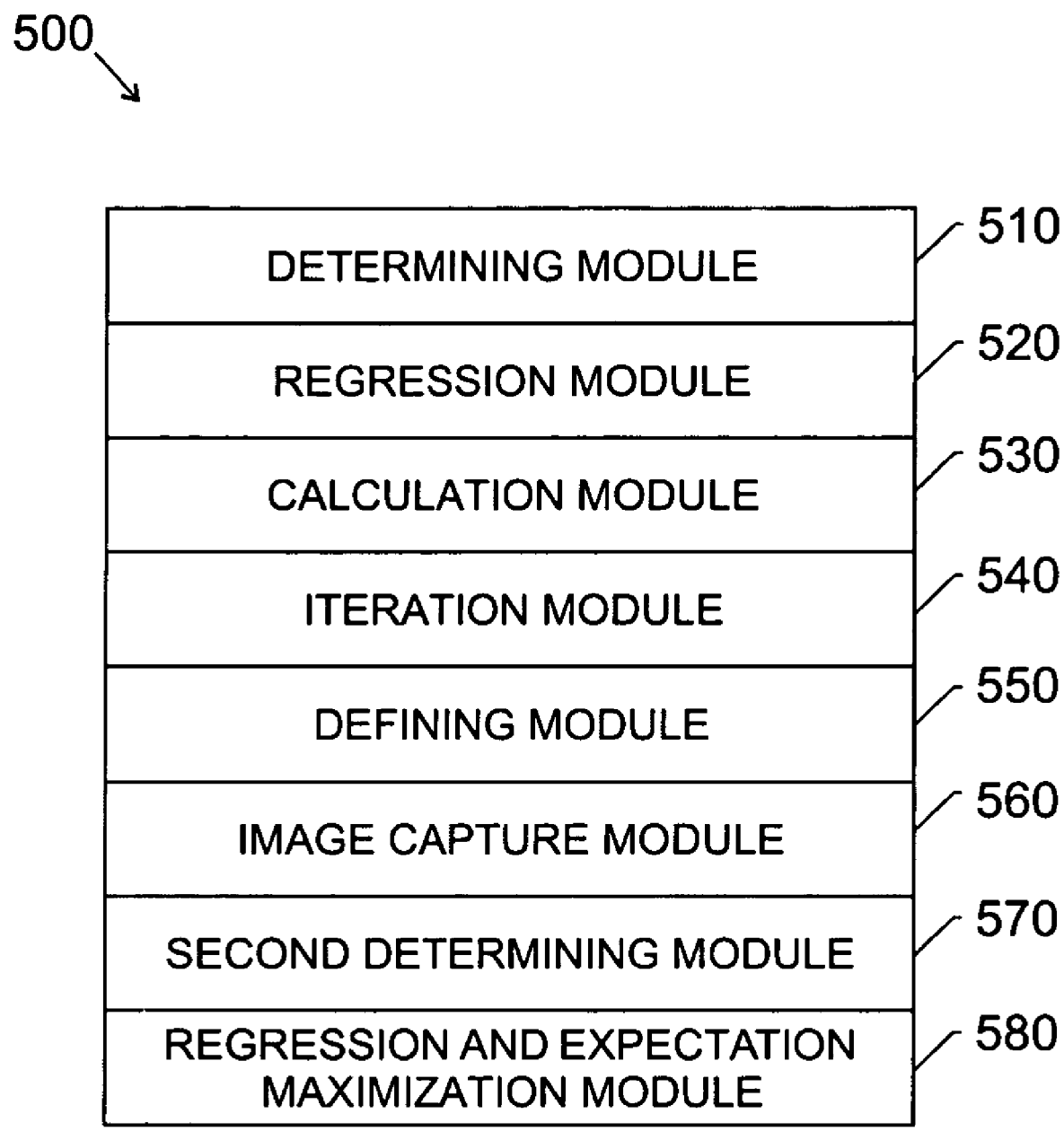
FIG. 5 is a block diagram illustrating a computer system in accordance with embodiments of the present invention.

FIG. 5 is a block diagram illustrating a computer system 500 in accordance with embodiments of the present invention. Specifically, FIG. 5 illustrates a computer system for automatically capturing an image. The computer system 500 may incorporate various modules, as is illustrated by FIG. 5. While FIG. 5 separately delineates specific modules, in other embodiments, individual modules may be split into multiple modules or combined into a single module. Further, individual modules and components may be hardware, software or some combination of both. In particular, the modules illustrated by FIG. 5 comprise: a determining module 510, a regression module 520, a calculation module 530, an iteration module 540, a defining module 550, an image capture module 560, a second determining module 570, and a regression and expectation maximization module.

In FIG. 5, the determining module 510 may determine distances between data points of a dataset and values correlated with a set number of functions. The regression module 520 may regress the set number of functions using data point membership probability and weighting factors associated with the determined distances. The calculation module 530 may calculate a difference value associated with the distances determined prior to and subsequent to the regressing. The iteration module 540 may facilitate repetition of the regressing, determining, and calculating of the regression module 520, the determining module 510, and the calculation module 530 upon determining the difference value is greater than a predetermined value. The defining module 550 may define an object. The image capture module 560 may capture the image based on a motion path estimation. The second determining module 570 may determine distances from each data point of the dataset to values within each function of the set number of functions. The regression and expectation maximization module 580 may apply a regression algorithm and an Expectation Maximization performance function on the dataset.

As noted above, FIG. 4 illustrates an exemplary method for performing regression clustering using a K-Harmonic Means objective function. However, method 300 is not restricted to using such a regression clustering method. As discussed above, various regression clustering techniques may be used for multiple path motion estimation 300. For example, an Expectation Maximization (EM) objective function, a K-Means (KM) objective function or a K-Harmonic Means (KHM) objective function may be used to regressively cluster data obtained from images. Each objective function offers a different approach for regressively clustering data and, therefore, at least three distinct methods are provided, which block 306 may incorporate to regressively cluster data.

An EM, KM or KHM objective function may be used for the regression clustering engine illustrated in FIG. 3. In each method, a set number of functions, K, may be selected (block 402) from a family of functions, $\Phi$, derived from datasets having similar variables by which to store information. The functions may be selected randomly or by any heuristics that are believed to give a good start (block 404). The determination of the optimum K may include techniques used in the data mining industry for clustering.

In embodiments in which Mean-Square Error (MSE) linear regression is used in the RC process, selecting the number of K functions may further include initializing coefficients, ck, of the functions $\{C_k | k=1, \ldots K\}$ (block 404).

In addition to selecting a set number of functions, each of the regression clustering methods described herein may include applying K regression functions, M where $M=\{f_1, \ldots f_K\} \subset \Phi)$, to the data, finding its own partition, $Z_k$, and regressing on the partition. The K regression functions are not necessarily linear. Both parts of the process, i.e., the K regressions and the partitioning of the dataset, optimize a common objective function. As will be described in more detail below, the partition of the dataset can be "hard" or "soft." A "hard" partition may refer to the designation of every data point within a dataset belonging to a subset. In this manner, the partitions of the data points may be clear and distinct. A "soft" partition, however, may refer to the ambiguous groupings of data points within subsets of a dataset. In some cases, such a categorization of data points may depend on the probability of data points belonging to particular subsets within the dataset rather than other subsets. Such a soft-partitioning of data is employed by the KHM and EM regression clustering method as described in more detail below.

The method of regression clustering using a K-Means objective function (referred to herein as RC-KM) solves the following optimization problem:

$$\min_{\{f_k\} \subset \Phi; \{Z_k\}} \text{Perf}_{RC-KM} = \sum_{k=1}^{K} \sum_{(x_i,y_i) \in Z_k} e(f_k(x_i), y_i) \qquad (1)$$

where Z represents a dataset with supervising responses x and y (i.e., $Z=(X,Y)=\{(x_i,y_i) | i=1, \ldots, N\}$) and $Z = \cup_{k=1}^{k} Z_k$ ($Z_k \cap_{k'} = \emptyset, k \neq k'$). The optimal partition will satisfy:

$$Z_k = \{(x, y) \in Z | e(f_k^{opt}(x), y) \leq e(f_{k'}^{opt}(x), y) \; \forall k' \neq k\}, \qquad (2)$$

which allows the replacement of the function in optimization problem (2) to result in:

$$\text{Perf}_{RC-KM}(Z, \{f_k\}_{k=1}^{K}) = \sum_{i=1}^{N} \text{MIN}\{e(f_k(x_i), y_i) | k = 1, \ldots, K\}. \qquad (3)$$

In other words, RC-KM determines an optimal clustering of data points by regressing functional relationships of the data points to have a minimum amount of total variation or error (e).

In general, the process of RC-KM may be executed through a monotone-convergent algorithm to find a local optimum of equation (1). One example of an RC-KM algorithm may include a first set of instructions for picking a set number of functions, K, within a dataset as described above. In some embodiments, selecting the number of K functions may further include initializing coefficients, ck, of the functions $\{c_k | k=1, \ldots K\}$.

In addition to selecting K number of functions, the RC-KM algorithm may include a second set of instructions for repartitioning the dataset in the r-th iteration, $r=1, 2, \ldots$, as:

$$Z_k^{(r)} = \{(x,y) \in Z | e(f_k^{(r-1)}(x),y) < e(f_{k'}^{(r-1)}(x),y) \forall k' \neq k\}. \qquad (4)$$

Such a repartitioning process facilitates a "hard" partition, as defined above. Each data point within the dataset may be associated with the regression function that results in the smallest approximation error. Using the RC-KM algorithm, distances between each of the data points and the regression functions may be determined and the errors of fitting the data points to the functions are compared. Algorithmically, for r>1, a data point in $Z_{k'}^{(r-1)}$ is moved to $Z_k^{(r)}$ if and only if: a) $e(f_{k'}^{(r-1)}(x),y) < e(f_k^{(r-1)}(x),y))$ and b) $e(f_{k'}^{(r-1)}(x),y) \leq e(f_{k''}^{(r-1)}(x),y)$ for all $k'' \neq k, k'$.

$Z_k^{(r)}$ inherits all the data points in $Z_k^{(r-1)}$ that are not moved. In the event of a tie between the error functions, the datapoint may be randomly grouped in either subset.

In addition to program instructions for function selection and clustering, the RC-KM algorithm may include a third set of program instructions for running a regression optimization algorithm. In particular, the third set of instructions may include an algorithm by which to alter the selected functions to more closely represent the data points within the respective partitions. In some cases, variable selections for the K regressions can be done on each partition independently with the understanding that an increase in the value of the objective function could be caused by such a process. In any case, the third set of program instructions may include any regression optimization algorithm that results in the following:

$$f_k^{(r)} = \arg\min_{f \in \Phi} \sum_{(x_i,y_i) \in Z_k} e(f(x_i), y_i) \qquad (5)$$

where $k=1, \ldots, K$. In some embodiments, regularization techniques may be employed to prevent over-fitting of the converged results from the regression algorithm. In addition or alternatively, boosting techniques may be used on each partition independently to improve the quality of the converged results within each partition. In any case, the regression algorithm may be selected by the nature of the original problem or other criteria. The fact that it is included in a regression clustering process adds no additional constraint on its selection.

In order to cluster the data into the optimum partitions, the second and third set of instructions of the RC-KM algorithm may be conducted repeatedly. Optimally, such a reiterative process continues until there are no more data points changing their membership within the partitions. If any data point does change its partition membership as a result of the second and third sets of instructions, the value of the objective function in equation (1) decreases. Consequently, the value of the objective function in equation (1) continues to decrease with each membership change. As a result, the RC-KM algorithm stops in finite number of iterations.

As noted above, some clustering techniques, such as K-Means clustering methods, may be sensitive to the initialization of partition centers. Similarly, RC-KM may be sensitive to the initialization of its K functions. More specifically, the convergence of data into clusters using RC-KM may depend on how closely the initial set of K functions represent the data, since the data points are partitioned into distinct subsets (i.e., hard partitioned) with respect to the selected functions during each iteration of the algorithm. In general, the initialization of the K functions may be dependent on the amount of and quality of available prior information. In many instances, however, there is minimal or no prior information available regarding the functional relationship of variables within a dataset. In some cases, more than one functional relationship may be found to represent a partition of data. As a result, convergence to a distinct set of partitions may be difficult using RC-KM techniques. In other cases, however, the initialization of the K functions using RC-KM may be good and, as a result, a dataset may be clustered into an optimum set of partitions using an RC-KM algorithm.

In contrast to K-Means clustering techniques, K-Harmonic Means (KHM) clustering algorithms are generally less sensitive to the initialization of the K functions due to KHM's methods of dynamically weighting data points and its "soft" partitioning scheme. An exemplary harmonic average based clustering method is described in U.S. Pat. No. 6,584,433 to Zhang et al. and is incorporated by reference as if fully set forth herein. Similar to KHM clustering, the K-Harmonic Means regression clustering process (RC-KHMp) described herein is generally less sensitive to the initialization of the K functions as discussed in more detail below.

RC-KHMp's objective function is defined by replacing the MIN( ) function in equation (3) by the harmonic average function, HA( ). In addition, the error function may be represented as $e(f_k(x_i),y_i) = \|f_k(x_i) - y_i\|^p$ where $p \geq 2$.

As a result, the objective function of RC-KHMp may be:

$$Perf_{RC\text{-}KHM_p}(Z, M) = \sum_{i=1}^{N} HA_{1 \leq k \leq K}\{\|f_k(x_i) - y_i\|^p\} \quad (6)$$

$$= \sum_{i=1}^{N} \frac{K}{\sum_{k=1}^{K} \frac{1}{\|f_k(x_i) - y_i\|^p}}$$

In general, different values of parameter p may represent different distance functions.

As noted above, an exemplary method of K-Harmonic Means regression clustering is depicted in the flowchart of FIG. 4. Such a method is described herein in reference to an exemplary algorithm for RC-KHMp. As with RC-KM, RC-KHMp may be employed through an algorithm which includes a first set of instructions for selecting a set number of K functions randomly or by any heuristics that are believed to give a good start. Such a process is noted in blocks 402-404. In some embodiments, the step may further include initializing coefficients, ck, of the functions $\{c_k|k=1, \ldots K\}$.

As noted above, the selected functions may be a subset of a plurality of functions used to correlate variable parameters of a dataset. In contrast to the hard partitioning used in RC-HM, RC-KHMp uses a soft partitioning scheme. Consequently, data points may not be distinctly associated with a single function when using an RC-KHMp algorithm. Rather, the RC-KHMp process may include determining the distances between each of the data points and each of the functions and computing probability and weighting factors associated with such distances for each of the data points as noted in blocks 402 and 408 in FIG. 4. In turn, the RC-KHMp algorithm may include a second set of instructions to determine approximate associations of the data points to the K functions based upon the probability and weighting factors. A calculation of the harmonic averages noted in block 406 may be used in the objective function of RC-KHMp as noted in equation (6) above and explained in more detail below. In some cases, the value of the weighting and probability factors may be dependent of the value of the local data points $z_i \epsilon Z_1$ as well as the values of the "global" or "common" coefficient vectors $\{c_k|k=1, \ldots K\}$.

In general, the probability of the i-th data point belonging to a particular k function may be computed as:

$$p(Z_k | z_i) = d_{i,k}^{p+q} / \sum_{l=1}^{K} d_{i,l}^{p+q}. \quad (7)$$

wherein:

$$d_{i,k} = \|f_k^{(r-1)}(x_i) - y_i\|. \quad (8)$$

The parameter q may be used to put the regression's error function as noted in equation (10) below in $L^q$-space. In addition, the parameter q may be used to reduce the association of data points to more than one of the selected K functions. In any case, the weighting factor for each data point may be computed using (i.e., each data point's participation may be weighted by):

$$a_p(z_i) = \sum_{l=1}^{K} d_{i,l}^{p+q} / \sum_{l=1}^{K} d_{i,l}^{p}. \quad (9)$$

In this manner, not all data points fully participate in all iterations in RC-KHMp like in RC-KM. As shown in equation (9), the value of weighting function $a_p(z_i)$ for a particular data point is proportional to the distance between the data point and the function. In particular, the value of weight function $a_p(z_i)$ is smaller when the data point is closer to the function than if the data point is farther away from the function. Weighting function $a_p(z_i)$ changes in each iteration as the regression functions are updated and, thus, is dynamic. As described above in reference to RC-KM and will be described below in reference to RC-EM, the participation of each data point is not weighted. As such, $a_p(z_i)$ is equal to 1 in RC-KM and RC-EM as noted below in equations (18) and (22).

The RC-KHMp process may include regressing K function (block 410) using the probability and weight factors computed in block 408. In particular, the RC-KHMp process may run any regression optimization algorithm that results in:

$$f_k^{(r)} = \arg\min_{f \in \Phi} \sum_{i=1}^{N} a_p(z_i) p(Z_k | z_i) \|f(x_i) - y_i\|^q \quad (10)$$

where k=1, ..., K. For simpler notations, $p(Z_k|z_i)$ and $a_p(z_i)$ are not indexed in equation (10) by q or p. In addition, $d_{i,k}$, p$(Z_k|z_i)$, and $a_p(z_i)$ in equations (7), (8), (9) and (10) are not indexed by the iteration r to simplify notations. As in RC-KM, variable selections for the K regressions in RC-KHMp can be done on each partition independently with the understanding that an increase in the value of the objective function could be caused by such a process. In addition, regularization techniques and/or boosting techniques may be employed to improve the quality of the converged results. In any case, the regression algorithm may be selected by the nature of the original problem or other criteria. The fact that it is included in a regression clustering process adds no additional constraint on its selection.

Block 412 includes the reiteration of blocks 406, 408, and 410 for the regressed set of functions. More specifically, the RC-KHMp process involves determining the distances between each of the data points and the regressed functions, calculating harmonic averages of such distances and computing probability and weighting factors for the data points based upon the determined distances.

Referring to block 412, changes occurring in the iteration may be checked and acted upon. For example, if the changes in the membership probabilities or in the K functions are smaller than a chosen threshold, the iteration may stop. Specifically, the RC-KHMp process may include computing a change in harmonic averages for the K functions prior to and subsequent to the regressing process described in reference to block 410. Such a computation may be included within the objective function for RC-KHMp as cited in equation (6) above. Block 412 may be used to determine if the change in harmonic averages is greater than a predetermined value. More specifically, since there is no discrete membership change in RC-KHMp, the continuation or termination of the method may be determined by measuring the changes to the RC-KHMp objective function (i.e., equation (6)). For example, in embodiments in which the change in harmonic average (i.e., the objective function) is greater than the predetermined value, the method may revert back to block 406 and determine distances between data points of the dataset and values correlated with the new set of functions (block 410). The method may subsequently follow the blocks 406-412 and, thus, provides an iterative process until the change in harmonic averages is reduced to a value below the predetermined level noted in block 412. As shown in FIG. 4, upon determining the change in harmonic averages (i.e., the objective function) is less than the predetermined value, the method may terminate. In particular, when the change in the objective function is less than a predetermined value, the method may stop. Alternatively, the method may be terminated when value of the objective function is less than a predetermined value.

Referring to an RC-EM process, the objective function is defined as:

$$\text{Perf}_{RC\text{-}EM}(Z, M) = -\log\left\{\prod_{i=1}^{N}\sum_{k=1}^{K}\frac{p_k}{\sqrt{(2\pi)^d|\Sigma_k|}} \text{EXP}\left(-\frac{1}{2}(f_k(x_i) - y_i)\Sigma_k^{-1}(f_k(x_i) - y_i)^T\right)\right\} \quad (11)$$

where d=dimension (Y). In the case in which d=1, $(f_k(x_i)-y_i)$ is a real number and $\Sigma_k^{-1}=1/\sigma_k^2$. An exemplary RC-EM algorithm may include a first set of instructions to select a set number of K functions, as described in reference to RC-KM and RC-KHMp. In some embodiments, the first set of instructions may further include instructions for initializing coefficients, ck, of the functions $\{c_k|k=1, \ldots K\}$ as described above. In addition to function selection, the RC-EM algorithm may include two steps by which to regressively cluster a dataset. In particular, the RC-EM algorithm may include an expectation step (E-Step) and a maximization step (M-Step).

In general, the E-Step may be used to determine how much of each datapoint is related to each subset. Such a step may be conducted by computing a probability factor in which:

$$p(Z_k^{(r)}|z_i) = \frac{\frac{p_k^{(r-1)}}{\sqrt{|\Sigma_k|}}\text{EXP}\left(-\frac{1}{2}(f_k^{(r-1)}(x_i) - y_i)\Sigma_{r-1,k}^{-1}(f_k^{(r-1)}(x_i) - y_i)^T\right)}{\sum_{k=1}^{K}\frac{p_k^{(r-1)}}{\sqrt{|\Sigma_k|}}\text{EXP}\left(-\frac{1}{2}(f_k^{(r-1)}(x_i) - y_i)\Sigma_{r-1,k}^{-1}(f_k^{(r-1)}(x_i) - y_i)^T\right)}. \quad (12)$$

The M-Step may use such a probability factor to regress the selected functions of the dataset. In particular, the M-step may use the following equations to regress the functions of a dataset $$p_k^{(r)} = \frac{1}{N}\sum_{i=1}^{N}p(Z_k^{(r)}|z_i) \quad (13)$$

$$f_k^{(r)} = \arg\min_{f\in\Phi}\sum_{i=1}^{N}p(Z_k^{(r)}, z_i)\|f(x_i) - y_i\|^2 \quad (14)$$

$$\Sigma_{r,k} = \frac{\sum_{i=1}^{N}p(Z_k^{(r)}|z_i)(f_k^{(r)}(x_i) - y_i)^T(f_k^{(r)}(x_i) - y_i)}{N * p_k^{(r)}} \quad (15)$$

The E-Step and M-Step may be conducted in an iterative process. As with RC-KM, RC-EM may be sensitive to the initialization of functions and, consequently, may have difficultly in converging the data points in an optimal set of subsets in some embodiments. In other cases, however, the initialization of functions within a dataset may be good and the dataset may be clustered into an optimum set of partitions using an RC-EM algorithm.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system, comprising:
   an image capturing device; and
   an object-oriented motion detector having a regression clustering algorithm configured for motion analysis, the object-oriented motion detector being configured to detect motion of a subject and signal the image capturing device responsive to the motion of the subject, wherein the regression clustering algorithm comprises a K-Harmonic Mean regression algorithm and a K-Harmonic Mean performance function.

2. The system of claim 1, wherein the motion analysis algorithm signals the image capturing device to record an image.

3. The system of claim 1, comprising:
   an automatic mode that enables automatic activation of the image capturing device based on a motion extreme.

4. A method for automatically capturing an image, comprising:
   performing a motion analysis on image data with a K-Harmonic Mean regression algorithm and a K-Harmonic Mean performance function, comprising:
     determining distances between data points of a dataset and values correlated with a set number of functions;
     regressing the set number of functions using data point membership probability and weighting factors associated with the determined distances;
     calculating a difference value associated with the distances determined prior to and subsequent to the regressing;
     repeating the regressing, determining, and calculating upon determining the difference value is greater than a predetermined value;
     defining an object; and
     capturing the image based on a motion path estimation.

5. The method of claim 4, comprising:
   determining distances from each data point of the dataset to values within each function of the set number of functions.

6. The method of claim 4, wherein the difference value comprises a change between repeat calculations in the data point membership probabilities.

7. The method of claim 4, wherein the difference value is a change between repeat calculations in the set number of functions, wherein the set number of functions comprise K functions.

8. The method of claim 4, comprising:
applying a regression algorithm and an Expectation Maximization performance function on the dataset.

9. A system for automatically capturing an image, comprising:
a determining module that determines distances between data points of a dataset and values correlated with a set number of functions;
a regression module that regresses the set number of functions using data point membership probability and weighting factors associated with the determined distances, wherein the regression module comprises a K-Harmonic Mean performance function that is configured to function as a regression clustering algorithm;
a calculation module that calculates a difference value associated with the distances determined prior to and subsequent to the regressing;
an iteration module that facilitates repetition of the regressing, determining, and calculating of the regression module, the determining module, and the calculation module upon determining the difference value is greater than a predetermined value;
a defining module that defines an object; and
an image capture module that captures the image based on a motion path estimation.

10. The system of claim 9, comprising:
a second determining module for determining distances from each data point of the dataset to values within each function of the set number of functions.

11. The system of claim 9, wherein the difference value comprises a change between repeat calculations in the data point membership probabilities.

12. The system of claim 9, wherein the difference value is a change between repeat calculations in the set number of functions, wherein the set number of functions comprise K functions.

13. The system of claim 9, comprising:
a regression and expectation maximization module that applies a regression algorithm and an Expectation Maximization performance function on the dataset.

14. A computer readable storage medium storing a computer program product tangibly embodying program instructions executable by a processor, the program instructions, comprising:
a determining module stored on the computer-readable medium, the determining module adapted to determine distances between data points of a dataset and values correlated with a set number of functions;
a regression module stored on the computer-readable medium, the regression module adapted to regress the set number of functions using data point membership probability and weighting factors associated with the determined distances, wherein the regression module comprises a K-Harmonic Mean performance function that is configured to function as a regression clustering algorithm;
a calculation module stored on the computer-readable medium, the calculation module adapted to calculate a difference value associated with the distances determined prior to and subsequent to the regressing;
an iteration module stored on the computer-readable medium, the iteration module adapted to facilitate repetition of the regressing, determining, and calculating of the regression module, the determining module, and the calculation module upon determining the difference value is greater than a predetermined value;
a defining module stored on the computer-readable medium, the defining module adapted to define an object; and
an image capture module stored on the computer-readable medium, the image capture module adapted to capture the image based on a motion path estimation.

15. The program of claim 14, comprising:
a regression and expectation maximization module stored on the computer-readable medium, the regression and expectation maximization module adapted to apply a regression algorithm and an Expectation Maximization performance function on the dataset.

16. An automatic image capturing system, comprising:
means for performing a motion analysis on image data with a K-Harmonic Mean regression algorithm and a K-Harmonic Mean performance function, comprising:
means for determining distances between data points of a dataset and values correlated with a set number of functions;
means for regressing the set number of functions using data point membership probability and weighting factors associated with the determined distances;
means for calculating a difference value associated with the distances determined prior to and subsequent to the regressing;
means for facilitating repeating the regressing, determining, and calculating upon determining the difference value is greater than a predetermined value;
means for defining an object; and
means for capturing the image based on a motion path estimation.

* * * * *

UNITED STATES PATENT AND TRADEMARK OFFICE
CERTIFICATE OF CORRECTION

PATENT NO. : 7,403,640 B2  Page 1 of 1
APPLICATION NO. : 10/834589
DATED : July 22, 2008
INVENTOR(S) : Bin Zhang et al.

It is certified that error appears in the above-identified patent and that said Letters Patent is hereby corrected as shown below:

In column 7, line 41, delete " $Z_k^{(r)}=\{(x,y)\in Z | e(f_k^{(r-1)}(x),y) < e(f_k^{(r-1)}(x),y) \forall k' \neq k\}$ " and insert -- $Z_k^{(r)} = \{(x,y) \in Z | e(f_k^{(r-1)}(x),y) \leq e(f_{k'}^{(r-1)}(x),y) \quad \forall k' \neq k\}$ --, therefor.

In column 7, line 51, delete " $e(f_{k'}^{(r-1)}(x),y) \leq e(f_{k''}^{(r-1)})$ " and insert -- $e(f_{k'}^{(r-1)}(x),y) \leq e(f_{k''}^{(r-1)})$ --, therefor.

In column 9, line 45, delete "$z_i \varepsilon Z_1$" and insert -- $z_i \varepsilon Z_l$ --, therefor.

In column 10, line 32, delete "$d_{i,k}p$" and insert -- $d_{i,k}$, p --, therefor.

In column 11, line 30, delete " $\Sigma_k^{-1}=1/\sigma_k^2$ " and insert -- $\Sigma_k^{-1} = 1/\sigma_k^2$ --, therefor.

Signed and Sealed this

Eighth Day of June, 2010

David J. Kappos
*Director of the United States Patent and Trademark Office*